(12) United States Patent
Kubota et al.

(10) Patent No.: US 8,094,192 B2
(45) Date of Patent: Jan. 10, 2012

(54) DRIVING SUPPORT METHOD AND DRIVING SUPPORT APPARATUS

(75) Inventors: Tomoki Kubota, Okazaki (JP); Hidefumi Okabe, Okazaki (JP); Minoru Takagi, Okazaki (JP)

(73) Assignee: Aisin AW Co., Ltd., Aichi (JP)

( * ) Notice: Subject to any disclaimer, the term of this patent is extended or adjusted under 35 U.S.C. 154(b) by 1068 days.

(21) Appl. No.: 11/951,438

(22) Filed: Dec. 6, 2007

(65) Prior Publication Data

US 2008/0151054 A1 Jun. 26, 2008

(30) Foreign Application Priority Data

Dec. 20, 2006 (JP) ................................. 2006-343348

(51) Int. Cl.
*H04N 7/18* (2006.01)
(52) U.S. Cl. ........................................................ 348/148
(58) Field of Classification Search .................... 348/148
See application file for complete search history.

(56) References Cited

U.S. PATENT DOCUMENTS

| 2005/0168695 | A1* | 8/2005 | Ooba et al. ................ 353/13 |
| 2008/0129756 | A1* | 6/2008 | Iwano ........................ 345/632 |

FOREIGN PATENT DOCUMENTS

| DE | 102004038822 | 3/2006 |
| JP | 2004-064131 | 2/2004 |
| JP | 2005-184142 | 7/2005 |
| JP | 2005-184225 | 7/2005 |
| JP | 2006-044596 | 2/2006 |
| JP | 2006-290304 | 10/2006 |
| JP | 2007-124609 | 5/2007 |
| WO | 00/07373 | 2/2000 |

OTHER PUBLICATIONS

European Search Report issued in EP 07023782.1, mailed Sep. 6, 2010, 6 pages.
Japanese Office Action in Application No. 2007-205670, dated Jun. 7, 2011 and English-language translation.

* cited by examiner

*Primary Examiner* — Joseph Avellino
*Assistant Examiner* — Marshall McLeod
(74) *Attorney, Agent, or Firm* — Bacon & Thomas, PLLC

(57) ABSTRACT

A driving support method and a driving support apparatus clearly project an image of a specific target object onto a pillar within a vehicle. The apparatus includes a camera installed on the vehicle that captures a dead-angle area created by the pillar and a projector projecting the image captured by the camera onto the interior surface of the pillar. The driving support unit also includes an image processor that sets a reference point Pc on an indicator on a road surface, sets a virtual plane VP passing through the reference point Pc, performs coordinate conversion for image data input from the camera onto the virtual plane VP, and outputs to a projector the image data for which the coordinate conversion has been performed.

4 Claims, 9 Drawing Sheets

DRIVING SUPPORT METHOD AND DRIVING SUPPORT APPARATUS

INCORPORATION BY REFERENCE

The disclosure of Japanese Patent Application No. 2006-343348 filed on Dec. 20, 2007, including the specification, drawings and abstract thereof, is incorporated herein by reference in its entirety.

BACKGROUND

1. Related Technical Fields

Related technical fields include driving support methods and driving support apparatuses.

2. Related Art

In-vehicle systems that image the areas which are dead-angles for the driver with an onboard camera and show them on a display have been developed to support safe driving. For example, one such system has been proposed wherein the onboard camera captures an image of the dead-angle area created by a front pillar of the vehicle and the captured images are displayed on the interior side of the front pillar, which is one of two front pillars, one on the left and one on the right, that support the windshield or the roof. The pillars are located diagonally forward from the driver sitting in the driver's seat and block a part of the driver's field of vision. The front pillars must have at least a predetermined size for the sake of safety.

The above-described system, as shown in FIG. 12, includes a camera 100 installed in the vehicle body for imaging an area 106, an image processor that performs image processing on the image signals output from the camera 100, and a projector (not shown in the diagram) that projects the captured images onto the interior side of a front pillar 101. With this system, the driver may visually recognize the outside scene as if seeing through the front pillar 101 from a position 102. Thus, the driver can recognize the road shape or an obstacle to the front and side of the vehicle at an intersection and so forth.

When projecting images captured by the camera 100 onto the pillar 101, the projected image on the pillar 101, unfortunately, tends to tilt or be out of alignment against the scene that the driver is actually viewing through the window, because the viewing angle of the camera 100 and the viewing angle of the driver are not matched. To address the foregoing problem, Japanese Unexamined Patent Application Publication No. 2005-184225 discloses a system which executes a projection conversion of the images captured by the camera using a virtual plane (a surface of a virtual screen) set for the purpose of adjusting to the driver's viewing angle.

SUMMARY

However, when a virtual plane 103 is defined at a position a predetermined distance from the driver's position 102, as shown in FIG. 12, indications on a road surface, traffic lights, obstacles, and so forth, located at other than the position of the virtual plane, tend not to be displayed properly when projected onto the pillar. That is to say, if a target object 104 to be visually recognized is located on the virtual plane 103 as shown in FIG. 12, the target object 104 will be projected onto the pillar 101 as an image 104a without distortion as shown in FIG. 13. However, a target object 105, located at a position spaced from the virtual plane 103, will be displayed on the pillar 101 as an image 105a in a tilted state or out of alignment against the actual scene viewed through a window 107 and/or 108.

Thus, when obstacles that require the driver's close attention, such as an indication on the road surface or a pedestrian, are not located in the virtual plane 103, the obstacles may appear distorted as projected onto the pillar.

Accordingly, an object of the present invention is to provide a driving support method and a driving support apparatus capable of clearly projecting the image of a specific target object onto the pillar.

Thus, the present invention provides a driving support method, using a camera installed in a vehicle, for imaging a dead-angle area created by a pillar of the vehicle, and for displaying an image captured by the camera on the interior side of the pillar, comprising the steps of:

setting an object on a road surface in the vicinity of the vehicle as a drawing reference object;

setting a virtual plane at a position where the virtual plane passes through the drawing reference object;

coordinate converting the image data from the camera; and displaying an image, corresponding to the dead-angle area created by the pillar, on the interior side of the pillar using the converted image data.

Thus, in the method of the present invention, a virtual plane is set at a position that passes through a drawing reference object, and an image is subjected to coordinate conversion by projection onto the virtual plane. Therefore, even while the vehicle is moving, the drawing reference object can always be displayed on the interior surface of the pillar without distortion.

In another aspect the present invention provides a driving support apparatus, using a camera installed in a vehicle for filming a dead-angle area created by a pillar of the vehicle, comprising:

target object setting means for setting an object on a road surface in the vicinity the vehicle as a drawing reference object;

virtual plane setting means for setting a virtual plane at a position where the virtual plane passes through the drawing reference object;

image processing means for coordinate conversion of image data from the camera, utilizing the virtual plane; and output control means for displaying an image corresponding to the dead-angle area on the interior side of the pillar using the image data having been subjected to coordinate conversion.

Because the driving support apparatus sets a virtual plane at a position that passes through a drawing reference object and executes a coordinate conversion on that virtual plane, the driving support apparatus can always display the image of the drawing reference object on the interior surface of the pillar without distortion, even while the vehicle is moving.

Preferably, the target object setting means, on the basis of stored map data for a position of an indication on a road surface or a stationary object on the road surface, sets the road surface indication or the stationary object as the drawing reference object. Because the position of the drawing reference object can be obtained in advance on the basis of the map data, the coordinate conversion is performed at the proper time without delay and the drawing reference object can be displayed without distortion when the vehicle approaches the drawing reference object Alternatively, the apparatus of the present invention may further comprise obstacle detecting means for detecting an obstacle on a road surface, wherein the target object setting means sets the detected obstacle as the drawing reference object. Therefore, a pedestrian or the like, to which the driver should pay close attention, can be displayed without distortion.

Preferably, the imaging plane of the camera is set so that it intersects the virtual plane. Therefore, the camera can focus on the object in the virtual plane, i.e., on the drawing reference object. Thus, the drawing reference object can be displayed clearly on the interior surface of the pillar

BRIEF DESCRIPTION OF THE DRAWINGS

Various embodiments of the present invention will now be described with reference to the accompanying drawings, wherein.

DESCRIPTION OF PREFERRED EMBODIMENTS

Figure 1:
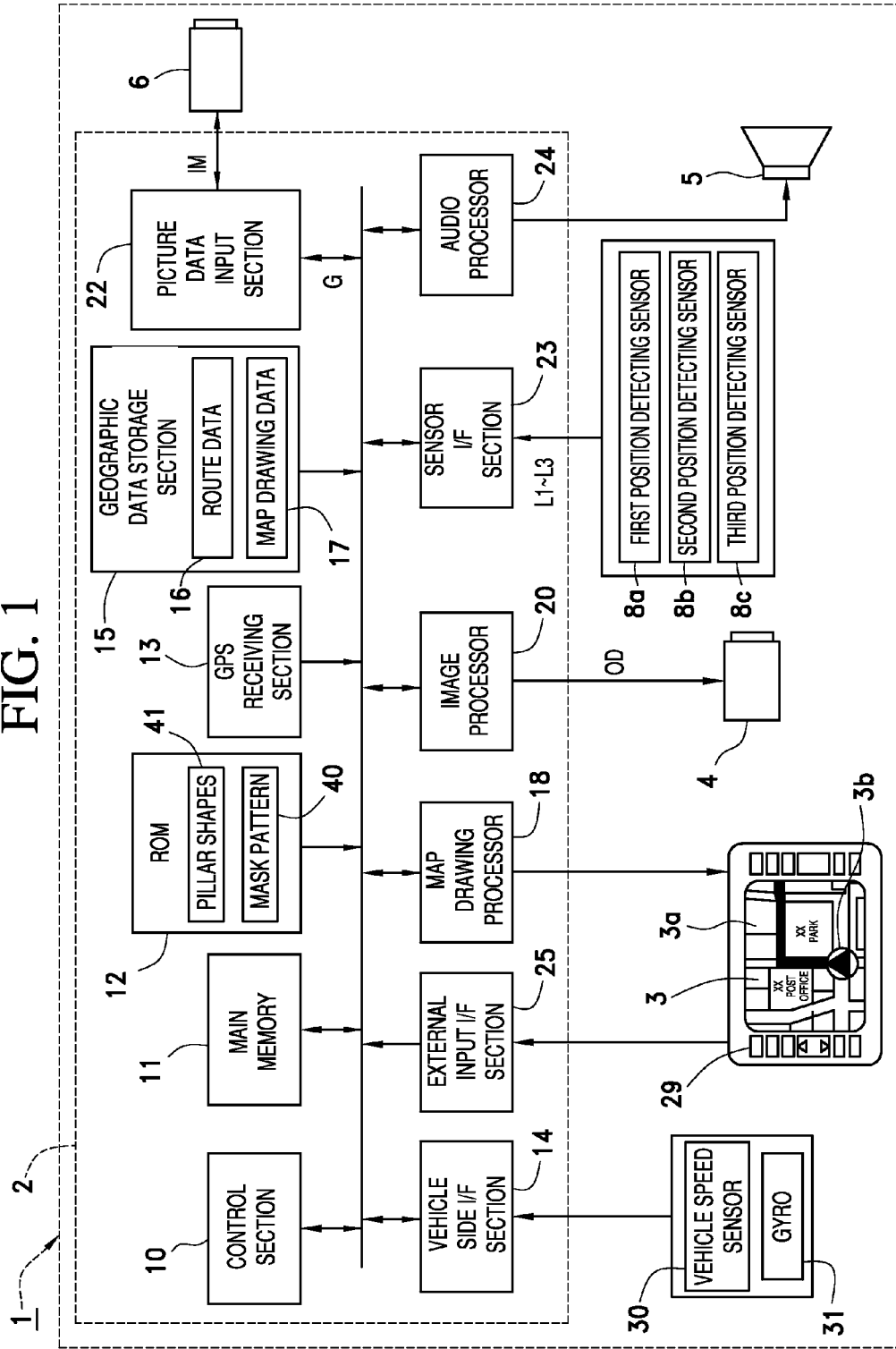
FIG. 1 is a block diagram illustrating a preferred embodiment of the driving support system of the present invention.

FIG. 1 illustrates one embodiment of a driving support system 1, exemplifying the present invention, mounted on a vehicle C. The driving support system 1 is shown in FIG. 1 as including a driving support unit 2, a display 3, a projector 4 serving as a projection device, a speaker 5, a camera 6 serving as an imaging device, a first position detecting sensor 8a, a second position detecting sensor 8b, and a third position detecting sensor 8c.

The driving support unit 2 includes a control section 10, a nonvolatile main memory 11, a ROM 12, and a GPS receiving section 13. The control section 10 may be a CPU, MPU, ASIC, or the like and provides the main control of processing in accordance with a driving support program stored in the ROM 12. The main memory 11 temporarily stores results of computation by the control section 10.

The control section 10 obtains satellite information pertaining to transmissions and times of transmissions that the GPS receiving section 13 has received from a GPS satellite and calculates absolute position of the vehicle C by means of radio navigation. The control section 10 also receives, as inputs, a vehicle speed pulse and angular velocity, respectively, from a vehicle speed sensor 30 and a gyro 31 provided in the vehicle C, via a vehicle side I/F section 14 in the driving support unit 2. Then the control section 10 calculates a relative position, i.e. relative to a reference position, by means of autonomous navigation using the vehicle speed pulse and the angular velocity, combines the relative position with the absolute position which has been calculated by means of the radio navigation, and specifies a position for the vehicle.

In addition, the driving support unit 2 includes a geographic data storage section 15. The geographic data storage section 15 may be an external storage medium such as a built-in hard drive, an optical disk, or the like. The geographic data storage section 15 stores data for each route network (hereinafter, referred to as route data 16) serving as map data used for searching for a route to a destination and also stores map drawing data 17, i.e. map data for outputting a map screen 3a on the display 3.

The route data 16 is data for roads in each of the grid sections into which the entire nation has been divided. The route data 16 includes an identifier for each grid section, node data for nodes indicating an end point of an intersection or a road, an identifier for each of links connecting to each of the nodes, data for link cost, and so forth. By using the route data 16, the control section 10 searches for a route to a destination and determines whether or not the vehicle C is approaching a guidance point, for example, an intersection.

The map drawing data 17 is that data used for drawing a road shape, a background, and so forth, and is stored for each grid section into which a national map has been. The map drawing data 17 includes data pertaining to road indicators such as a centerline, a white lane line, e.g. which demarks the shoulder of the road, a zebra zone, a pedestrian crossing, and so forth, and also includes data pertaining to objects installed on the road such as traffic lights and so forth. More specifically, the type of road indicator, coordinates of the positions of road indicators, the type of installed object on the road surface, e.g. signs and signals, coordinates of the position of the installed objects, and so forth, are stored in association with an intersection or curve at each of various geographical locations.

As shown in FIG. 1, the driving support unit 2 includes a map drawing processor 18. The map drawing processor 18 reads out the map drawing data 17, for drawing a map an area around the vicinity of the vehicle, from the geographic data storage section 15, generates data for map output, and displays the map screen 3a, based on the data, on the display 3. The map drawing processor 18 also superimposes a vehicle position indicator 3b indicating the position of vehicle C on the map screen 3a.

In addition, the driving support unit 2 includes an audio processor 24. The audio processor 24 has an audio file (not shown) and outputs voice for route guidance to a destination from the speaker 5, for example. Further, the driving support unit 2 includes an external input I/F section 25. The external input I/F section 25 receives a signal from an operation switch 26 associated with the display 3 or from a touch panel display 3, generated by a user's input operation, and then outputs the received signal to the control section 10.

Figure 2:
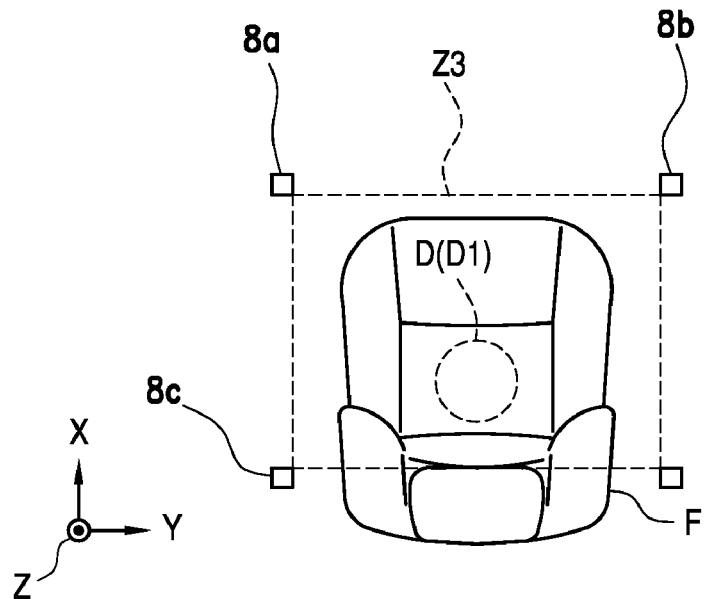
FIG. 2 is a diagram illustrating position detecting sensors for detecting the position of a driver's head.

The driving support unit 2 further includes a sensor I/F section 23 serving as detecting means. The sensor I/F section 23 receives signals from the first position detecting sensor 8a, the second position detecting sensor 8b, and the third position detecting sensor 8c. The first position detecting sensor 8a, the second position detecting sensor 8b, and the third position detecting sensor 8c are ultrasonic sensors and are installed around a driver D sitting in a front seat F inside vehicle C as shown in FIG. 2. The first position detecting sensor 8a is installed near a rearview mirror (not shown in the diagrams) nearly as high as or slightly higher than head D1 of the driver D.

The second position detecting sensor 8b is installed near the top of a door window W2 (see FIG. 3) diagonally forward to right side of the driver D. The third position detecting sensor 8c is installed at the left side of the front seat F, inside roof R. Ultrasonic waves transmitted from a sensor head of each of the position detecting sensors 8a, 8b, and 8c are reflected from the head D1 of the driver D. Each of the position detecting sensors 8a, 8b, and 8c gauges the time from when the ultrasonic wave is transmitted to when the reflected wave is received, and, on the basis of the gauged time, each of the relative distances to the head D1 is calculated. Each calculated relative distance is output to the control section 10 via the sensor I/F section 23. Alternatively, the sensor I/F section 23 could be made to calculate the relative distances to the head D1 on the basis of the signals from the position detecting sensors 8a, 8b, and 8c.

The control section 10, by means of a conventional method, determines a center position of the head Dc by triangulation on the basis of a range of head movement wherein the head D1 of a driver D of standard build may possibly move while sitting in the driver's seat and also on the basis of each of the relative distances that the first position detecting sensor 8a, the second position detecting sensor 8b, and the third position detecting sensor 8c has detected.

As shown in FIG. 1, the driving support unit 2 includes a picture data input section 22 and an image processor 20 serving as target object setting means, virtual plane setting means, image processing means, and output control means which receive image data IM from the picture data input section 22. The picture data input section 22 operates the camera 6 provided on the vehicle C and inputs the image data IM from the camera 6 under control by the control section 10.

Figure 3:
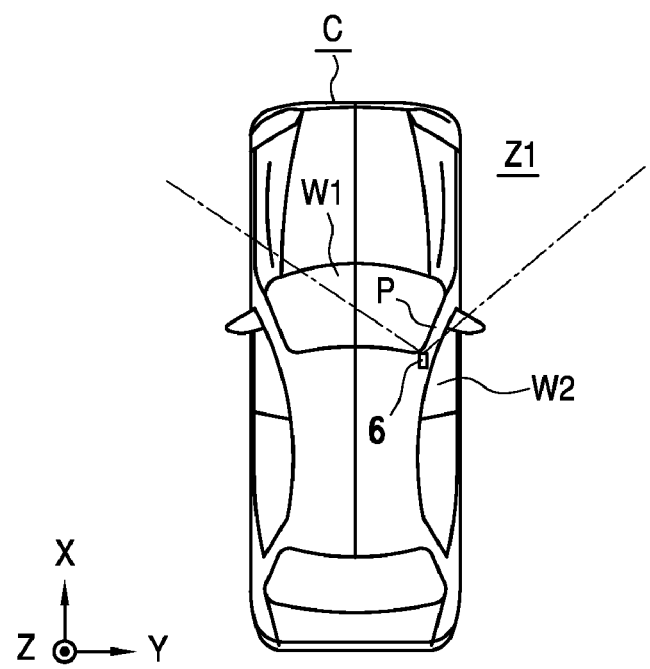
FIG. 3 is a diagram illustrating the position where a camera is installed.

The camera 6, which captures a color image, includes an optical mechanism, CCD image sensor (each not shown in the diagrams), an automatic-focus mechanism and so forth, e.g., a lens and a mirror. As shown in FIG. 3, the camera 6 is installed on the outside of a front pillar P (hereinafter simply referred to as pillar P) of the vehicle C with its optical axis oriented forward from the vehicle C. In the present embodiment, the camera 6 is installed on the pillar P on the right side of the driver's seat, as the driver's seat is located on the right side of the vehicle. The camera 6 images a scene of an area Z1 which includes the front right side of the vehicle C and a part of the right side of the vehicle C.

The image processor 20 in the driving support unit 2 obtains the image data IM from the camera 6 via the picture data input section 22. The image processor 20 also trims off the area blocked by the pillar P from the obtained image data IM and at the same time performs image processing to eliminate distortion from the image. The data after the image processing is output to the projector 4 (see FIG. 7) provided inside the vehicle and the projector 4 projects the image blocked by the pillar P onto the interior side of the pillar P.

Figure 4:
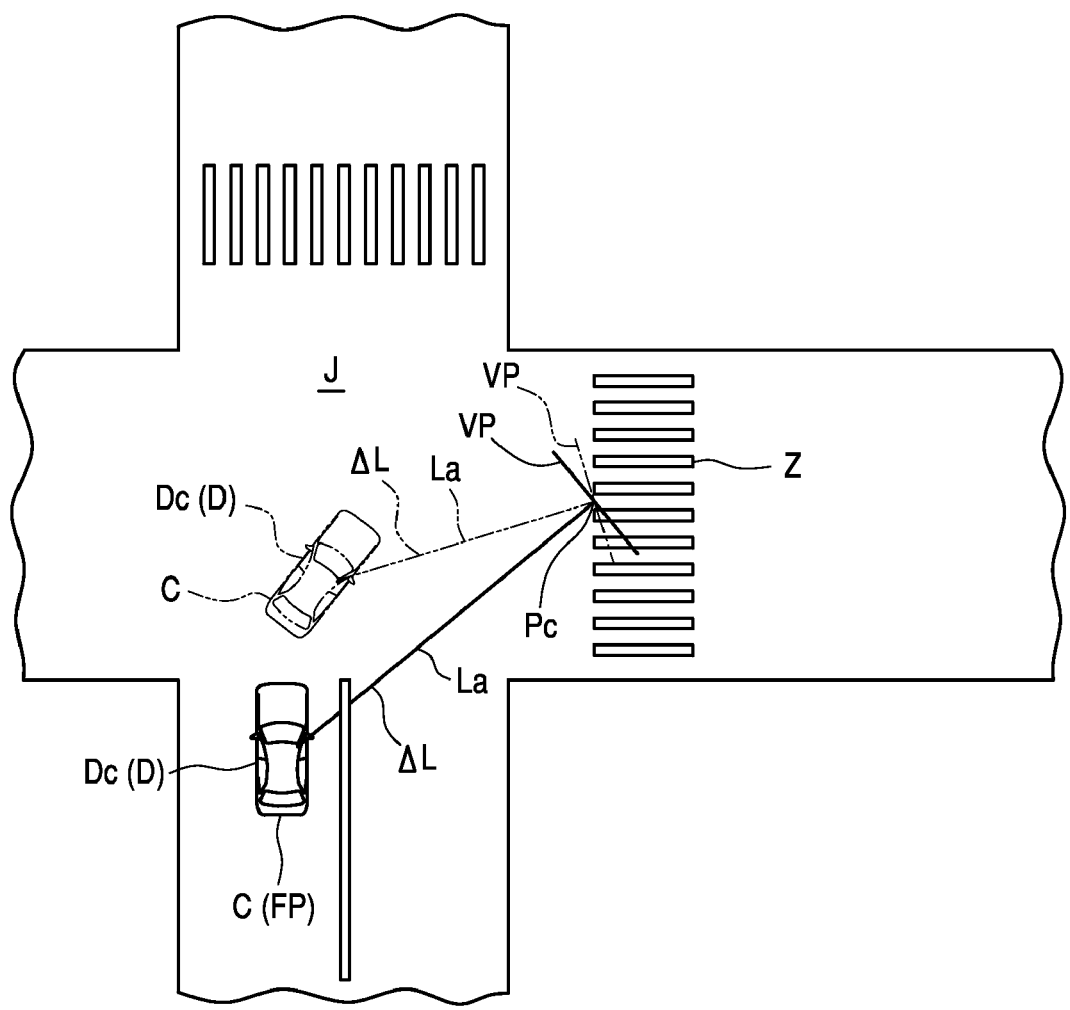
FIG. 4 is a diagram illustrating position of a virtual plane.

More specifically, when the control section 10 determines that the vehicle C has approached an intersection or a curve on the basis of the route data 16, the image processor 20 obtains coordinates of an object to be visually recognized and to which the driver should pay close attention in the intersection or the curve. In the present embodiment, the image processor 20 obtains coordinates of a pedestrian crossing Z, as a drawing reference object, on the basis of the map drawing data 17. For example, as shown in FIG. 4, the image processor 20 obtains the coordinates of a reference point Pc of a pedestrian crossing Z, indicated at the front side of the vehicle, on the basis of the map drawing data 17. The reference point Pc may be stored in the map drawing data 17 in advance, or the image processor 20 may set the reference point Pc on the basis of the coordinates of the entire pedestrian crossing Z in the map drawing data 17.

Figure 5:
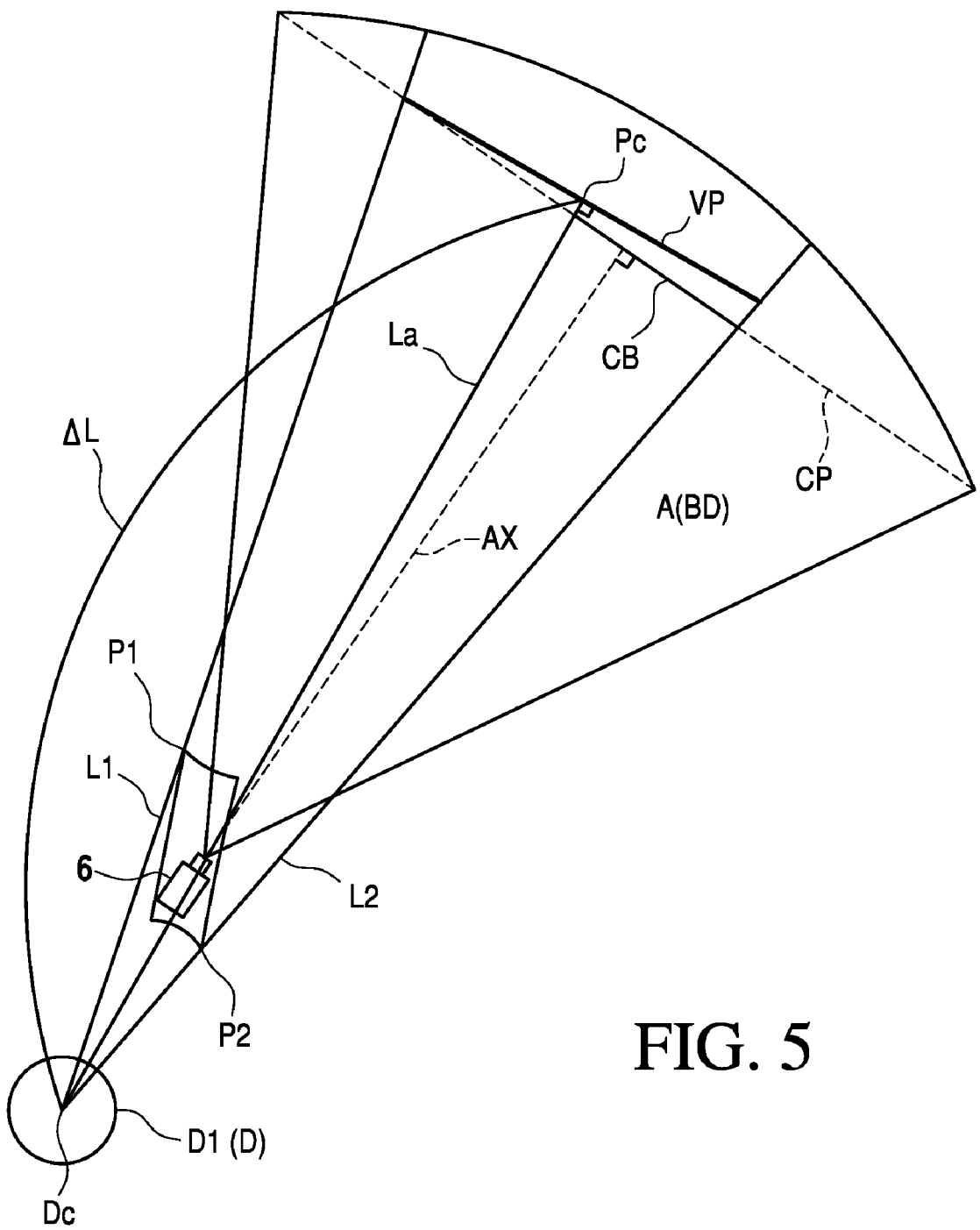
FIG. 5 is a diagram illustrating a virtual plane and a camera-imaging plane.

When the coordinates of the reference point Pc are obtained, the position of a virtual plane VP is determined based on the coordinates of the reference point Pc and the center position of the head Dc of the driver D, as has been detected by the first position detecting sensor 8a, the second position detecting sensor 8b, and the third position detecting sensor 8c. The virtual plane VP is a plane for correcting distortion in the image of the pedestrian crossing Z wherein the reference point Pc has been set. Further, the virtual plane VP is set in accordance with the viewing angle of the driver D with its origin at the viewing point of the driver D. When the image data IM for the image captured by the camera 6 undergoes coordinate conversion onto the virtual plane VP, objects in the virtual plane VP have their characteristic features displayed without being tilted or out of alignment. As shown in FIG. 5, the image processor 20 sets the virtual plane VP so as to include the reference point Pc and to extend vertically from a straight line La which connects the center position of the head Dc and the reference point Pc.

As shown in FIG. 4, when the vehicle C moves from an initial position FP wherefrom the virtual plane VP was set to the position shown with a two-dot chain line in the diagram, as the relative distance ΔL between the center position of the head Dc and the reference point Pc of the pedestrian crossing Z changes, the image processor 20 resets the virtual plane VP passing through the reference point Pc and extending vertically (perpendicular) from the straight line La. That is to say, the virtual plane VP is always set at the position passing through the reference point Pc without moving with the forward movement of the vehicle C. As shown in FIG. 4, when the vehicle is making a turn, the inclination of the straight line La which connects the center position of the head Dc and the reference point Pc is changed. Therefore, responsive to that change, only the angle of the virtual plane VP is changed.

The image processor 20 also determines a camera-imaging plane CP according to the position of the virtual plane VP. As shown in FIG. 5, the camera-imaging plane CP is perpendicular to the optical axis AX of the camera 6. The image processor 20 sets the camera-imaging plane CP to intersect the virtual plane VP. If a plurality of planes intersecting with the virtual plane VP are available, a plane intersecting in the vicinity of the reference point Pc is selected.

Once the camera-imaging plane CP is set, the image processor 20 focuses the camera 6 on the camera-imaging plane CP and obtains the image data IM via the picture data input section 22.

When the image data IM is obtained, a dead-angle segment on the image, which is blocked by the pillar P, is trimmed off from the image data IM. As shown in FIG. 5, the image processor 20 calculates tangent lines L1 and L2 which extend from the center of the head Dc of the driver D to points P1 and P2 on the pillar P, and the inside area between these tangent lines L1 and L2 is set as a dead-angle area A. In addition, after trimming off the area corresponding to the dead-angle area A from the image data IM, pillar dead-angle data BD is generated.

When the pillar dead-angle data BD is obtained, the image processor 20 performs a projection conversion on the pillar dead-angle data BD onto the virtual plane VP which passes through the reference point Pc. The projection conversion is a coordinate conversion from each pixel of a dead-angle segment CB inside the dead-angle area A on the camera-imaging plane CP to corresponding pixels on the virtual plane VP, using a conventional coordinate conversion.

Further, the image processor 20 converts the projection image which has been projected on the virtual plane VP in accordance with the three-dimensional shape of the pillar P on the basis of pillar shape data 41 (see FIG. 1) stored in the ROM 12 to generate projection data PD.

Figure 6:
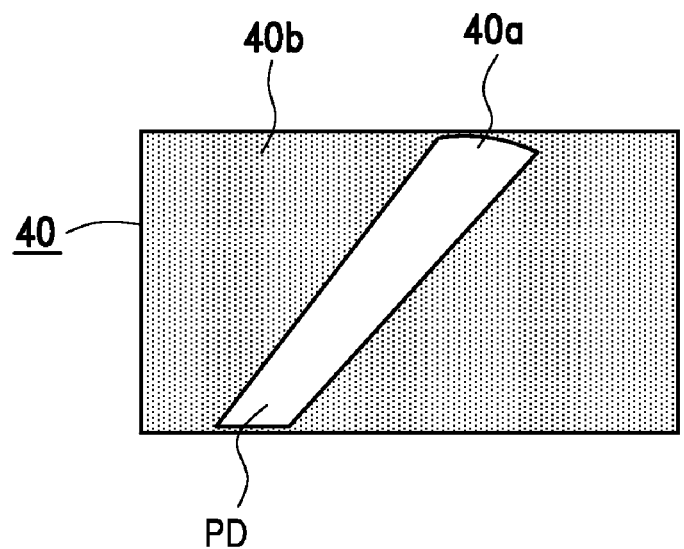
FIG. 6 is a diagram illustrating a mask pattern.

Using the projection data PD and the mask pattern 40 (see FIG. 1 and FIG. 6) stored in the ROM 12, the image processor 20 generates a picture signal for output to the projector 4. As shown in FIG. 6, the mask pattern 40 is the data for masking the projection data PD and includes data for an image display area 40a corresponding to the interior shape of the pillar P and for a masked area 40b. The image processor 20 reads the projection data PD into the image display area 40a and generates output data OD for the area of the mask 40b which is not to be displayed. The image processor 20 then outputs the generated output data OD to the projector 4.

Figure 7:
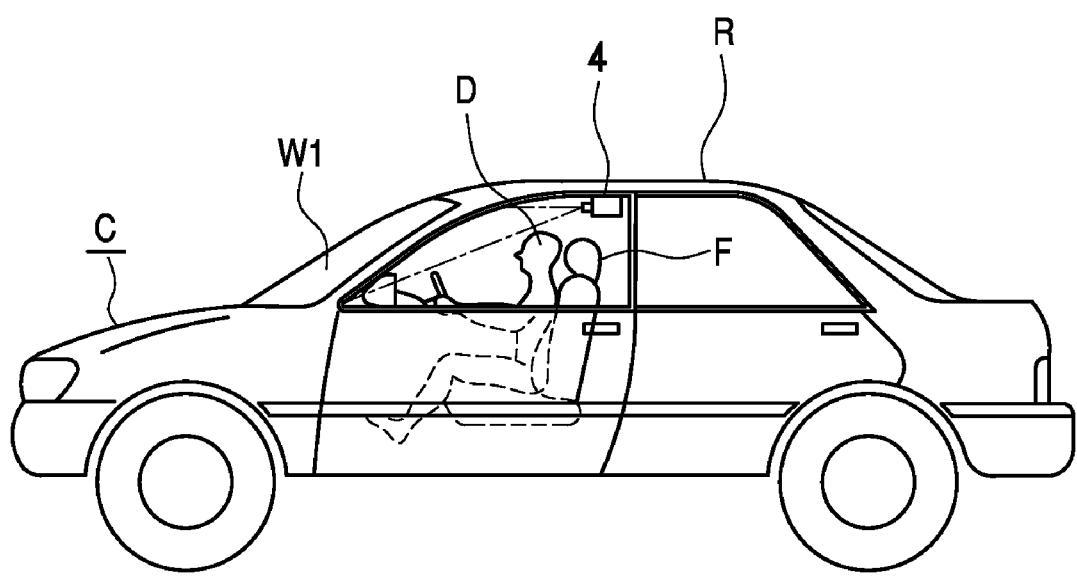
FIG. 7 shows a side view of a vehicle illustrating position of a projector.
Figure 8:
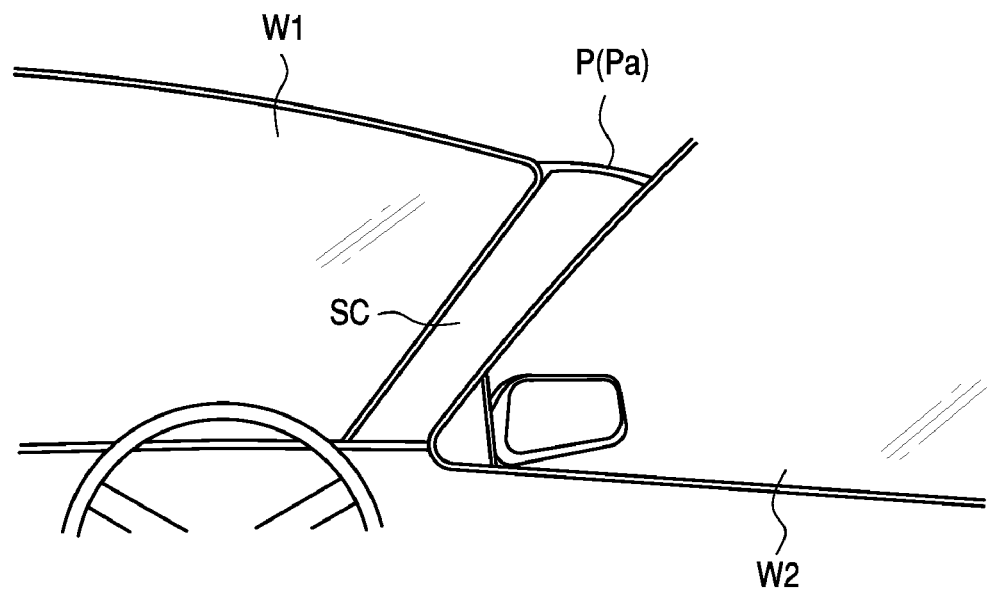
FIG. 8 is an elevational view of an interior surface of a pillar on which an image is projected.

As shown in FIG. 7, the projector 4 is installed on the interior of the roof R in the area vertical the driver's seat F so that the projector 4 is able to project an image onto the interior surface of the pillar P located at the right side of the vehicle C. As shown in FIG. 8, a screen SC which is cut off in accordance with the shape of the pillar P is projected onto the interior surface Pa of the pillar P. The projector 4 is adjusted to focus on the screen SC. If the interior surface Pa of the pillar P is made of a material and has a shape which can display a sharp image by receiving the projection beam from the projector 4, the screen SC may be omitted.

Figure 9:
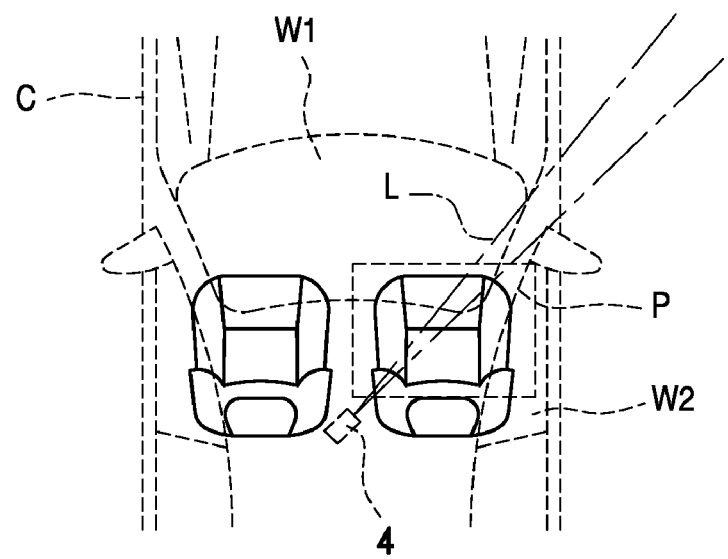
FIG. 9 illustrates projection direction of a projector.

As shown in FIG. 9, the projector 4 outputs a projection beam L onto the screen SC of the pillar P to show an image on the screen SC. No image is projected onto the windshield W1 or onto the door window W2 adjacent the screen SC, due to the mask 40b.

Figure 10:
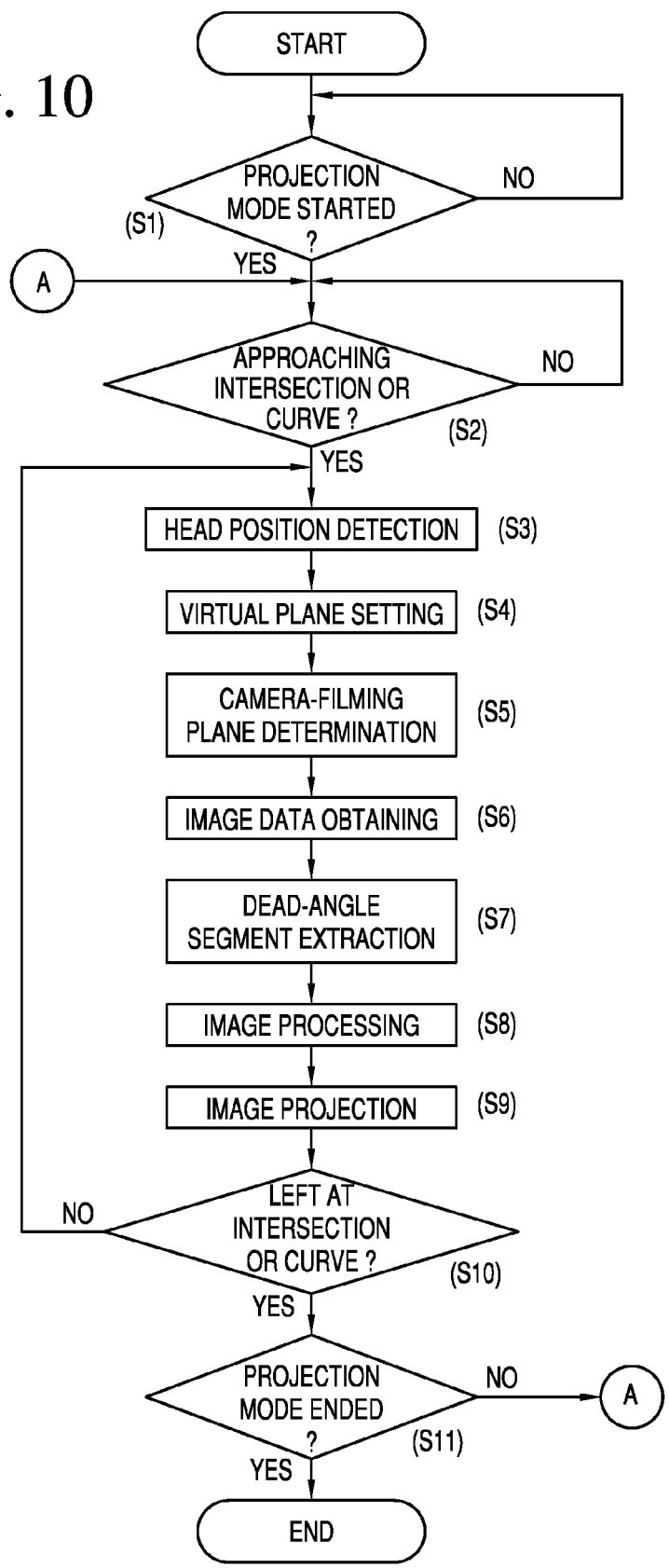
FIG. 10 is a flowchart of an embodiment of the method of present invention.

Next, an embodiment of operation of the present invention will be described with reference to FIG. 10. First, the control section 10 in the driving support unit 2 stands by to start a projection mode in which an image of a scene is projected onto the inner surface of the pillar P (step S1). For example, when the touch panel or the operation switch 26 is operated and the control section 10 receives a request for the start mode via the external input I/F section 25, the control section 10 determines to start projection. Alternatively, the control section 10 may determine to start the projection mode based on an ON signal from an ignition module (not shown in the diagrams).

When a determination is made to start the projection mode (YES in step S1), the control section 10 stands by waiting for the vehicle C to approach an intersection or a curve as indicated by the route data 16 (step S2). More specifically, when the control section 10 determines that the current position of the vehicle C has come within a predetermined distance (200 meters, for example) from, for example, a T-shaped intersection or a curve which has equal to or more than a predetermined curvature, the control section 10 determines that the vehicle C has approached the intersection or the curve.

When it is determined that the vehicle C has approached the intersection or the curve (YES in step S2), the control section 10 detects the position of the driver D's head by means of all of the position detecting sensors 8a, 8b, and 8c (step S3). In this manner, the control section 10 obtains each of the relative distances from the respective position detecting sensors 8a, 8b, and 8c to the head D1 via the sensor I/F section 23. Then, using each of the relative distances, the center position of the head Dc is determined by triangulation.

After the center position of the head Dc is calculated, the image processor 20 sets the virtual plane VP as described above (step S4). When the vehicle C is approaching an intersection J (see FIG. 4), the image processor 20 obtains the reference point Pc of the pedestrian crossing Z on the basis of the map drawing data 17 and sets the virtual plane VP at the position passing through the reference point Pc. If there is no pedestrian crossing Z, the reference point Pc may be at an indication on a road surface such, as a stop line, in front of the vehicle. When the vehicle C is approaching a curve, the reference point Pc may be that having the greatest curvature in the center line of the road.

The image processor 20 also sets the camera-imaging plane CP (step S5). At that time, the camera-imaging plane CP is set so that the intersection of the camera-imaging plane CP and the virtual plane VP extends through the point Pc or passes in the vicinity of the reference point Pc. While the camera-imaging plane CP and the virtual plane VP preferably intersect at the reference point Pc or in the vicinity of the reference point Pc, the camera-imaging plane CP should at least intersect with the virtual plane VP. Based on the camera-imaging plane CP which the image processor 20 has set, the camera 6 focuses on the camera-imaging plane CP and captures the image data IM (step S6).

The image processor 20 then sets the dead-angle area A being blocked by the pillar P, extracts the data corresponding to the dead-angle area A from the image data IM (step S7), and generates the pillar dead-angle data BD as described above.

After the pillar dead-angle data BD is generated, the image processor 20 executes image processing of the pillar dead-angle data BD (step S8). To be more precise, the image processor 20 executes the projection conversion of the pillar dead-angle data BD onto the virtual plane VP which has been set in step S4 as described above. Further, the image processor 20 converts the image after the projection conversion onto the virtual plane VP, in accordance with the pillar shapes stored in the ROM 12, and generates the projection data PD. Based on the projection data PD and the mask pattern 40, the image processor 20 also generates the output data OD for the masked area adjacent the pillar P.

The image processor 20 outputs the output data OD to the projector 4 which then projects an image of the area blocked by the pillar P onto the screen SC provided on the interior surface Pa of the pillar P as shown in FIG. 9 (step S9). Because the projected image displayed on the screen SC has undergone, in advance, the projection conversion onto the virtual plane VP in accordance with an indication on the road surface, for example, a pedestrian crossing Z, that indication on the road surface is displayed without tilting or being out of alignment with the scene viewed through the windshield W1 and the door window W2. Thus, at least the indication on a road surface to which the driver D should pay close attention in travel through the intersection J or the curve is projected onto the pillar P without distortion.

When the image processor 20 has projected an image on the pillar P, the control section 10 determines whether or not the vehicle C has left the intersection J or curve (step S10). If the control section 10 determines that the vehicle C is still located inside or in the vicinity of the intersection J or curve (NO in step S10), the procedure returns to step S3 and the sequence from head position detection (step S3) to image projection (step S9) is repeated. Thus, the driver's view blocked by the pillar P is projected onto the pillar P until the vehicle C has left the intersection J or curve.

Once the vehicle C is judged to have left the intersection J or curve (YES in step S10), the control section 10 determines whether or not the projection mode is to be terminated (step S11). The termination trigger may be a mode termination request by operation of the touch panel or the operation switch 26 or an OFF signal from an ignition module. Responsive to such a signal, the control section 10 terminates the projection mode (YES in step S1) and the processing is terminated accordingly.

The foregoing embodiment provides the following advantages.

With the foregoing embodiment, when the vehicle C has approached an intersection or a curve, the image processor 20 always sets the virtual plane VP at a position passing through the reference point Pc of a target object such as an indication on a road surface. In addition, the image processor 20 executes projection conversion of the image data IM captured by camera 6 onto the virtual plane VP. Accordingly, even when the vehicle C is moving, the target object to which the driver should pay close attention is continuously (always) displayed on the interior surface Pa of the pillar P without distortion.

In the foregoing embodiment, coordinates of a target object, for example an indication on the road surface, are obtained from the map drawing data 17 stored in the geographic data storage section, and the reference point Pc is set at the position of the target object. Thus, the reference point Pc may be set in advance by making use of the map drawing data 17 included in the driving support system 1 and, therefore, from the time when the vehicle C starts to enter the intersection J or a curve, an image may be displayed on the pillar P without distortion.

With the foregoing embodiment, the image processor 20 sets the camera-imaging plane CP to intersect with the virtual plane VP. Thus, the camera may focus on a target object in the virtual plane VP, and therefore, an image of the target object may be displayed with high contrast.

Numerous variants of the foregoing embodiment are possible, as described below.

In the foregoing embodiment, the reference point Pc of an indication on a road surface is set on the basis of the map drawing data 17. However, by execution of a white line recognition routine, for the image data IM from the camera 6, a white line (or a yellow line) on a road surface may be detected. Thus, in the alternative, the reference point Pc may be set at the edge or the center of the detected white line.

In the foregoing embodiment, the virtual plane VP is set in accordance with an indication on a road surface such as a pedestrian crossing Z. However, the target object, through which the virtual plane VP extends, may be different. For example, the virtual plane VP may be set on an installed object such as a traffic light. Alternatively, the vehicle C may be equipped with a radar or the like, as an obstacle detecting means, to calculate a relative distance to an obstacle in front of the vehicle, and when a target obstacle such as a pedestrian or a bicycle is detected, the virtual plane VP may be set on the obstacle. The judgment whether the obstacle is a pedestrian or a bicycle, for example, may be made by means of conventional image processing such as characteristic feature detection and so forth.

Data that indicates position of an indication on a road surface, such as a pedestrian crossing, may be obtained, for example, through road-to-vehicle communication, vehicle-to-vehicle communication, or any server delivering such data. In addition, data that indicates a position of an obstacle such as a pedestrian may also be received through an external apparatus such as on another vehicle.

In the foregoing embodiment, the audio processor 24 may be omitted if not using audio guidance.

Figure 11:
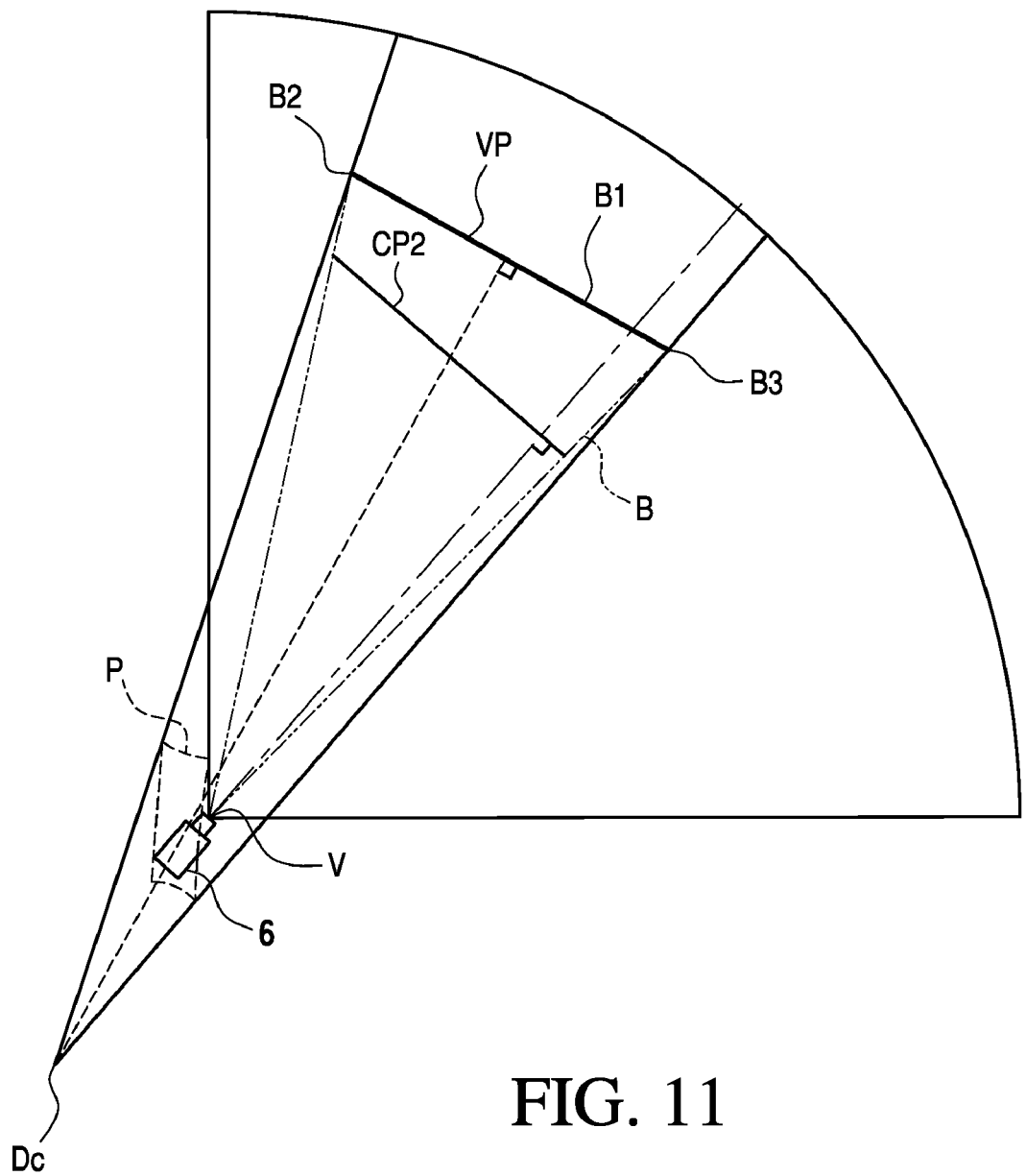
FIG. 11 is a diagram illustrating a camera-imaging plane.
Figure 12:
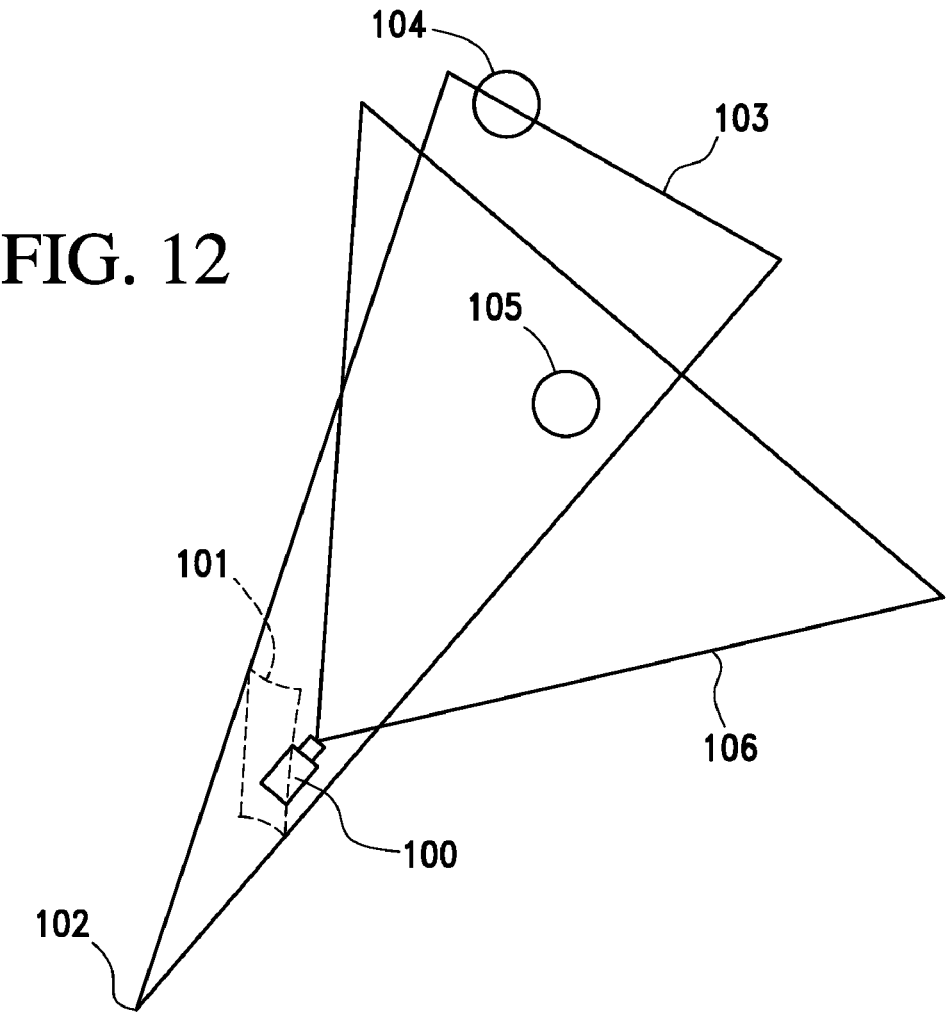
FIG. 12 is a diagram illustrating position of a virtual plane.
Figure 13:
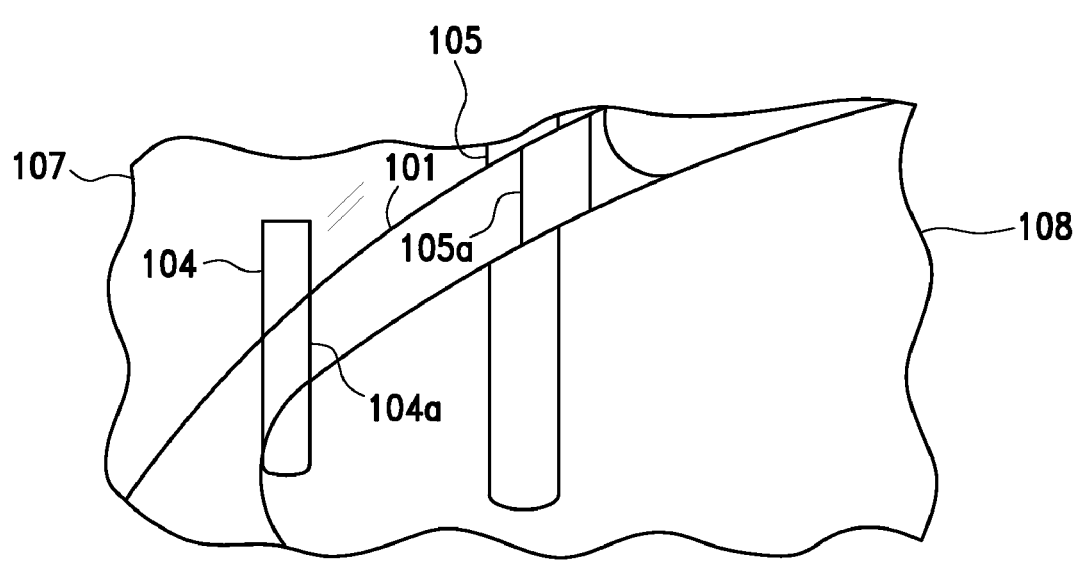
FIG. 13 is a diagram illustrating an image projected onto a pillar.

In the foregoing embodiment, the camera-imaging plane CP is set so as to intersect with the virtual plane VP, however, the camera-imaging plane CP may be set in front of the virtual plane VP as shown in FIG. 11. For example, the camera-imaging plane CP2 may be set in an area B which is surrounded by an end point B2, B3 of a dead-angle segment B1 blocked by the pillar P out of the virtual plane VP and out of the view V of the camera 6, between the virtual plane VP and the camera 6. In such a case, data for the area B, which area is blocked by the pillar P, is extracted from the image data IM. Then, the projection conversion is executed for the extracted data, converting it from the camera-imaging plane CP2 onto the virtual plane VP. Thereby, an indication on a road surface or an object to be visually recognized such as a pedestrian, located at the reference point Pc, may be displayed on the pillar P without distortion.

In the foregoing embodiment, the projector 4 projects an image on the interior surface Pa of the pillar P. However, a thin-model display may be provided on the interior side of the pillar P as a display means, and the image processor 20 may output the output data OD to the display.

In the foregoing embodiment, the camera 6 is provided on the outside of the front pillar P and captures an image of an area blocked from the driver's view by the front pillar P, however, the camera 6 may be provided on another pillar such as the one at the rear or the side of the vehicle. For example, the camera 6 may be installed on the outside of the rear pillar at the rear of the vehicle and may film an area blocked from the driver's view by the rear pillar. In such a case, the projector 4 is positioned to project an image onto the interior surface of the rear pillar, and an image processor 20 projects an image of the dead-angle area blocked by the rear pillar onto the interior surface of the rear pillar using the image data captured by the camera 6. Thereby, when the vehicle C moves backward toward a marked parking space, for example, by use of the projected image, a driver can see the parking space, although blocked by the rear pillar, and can execute parking with ease accordingly. Alternatively, plural cameras may be provided on the outside of a plurality of pillars, and a plurality of projectors 4 may be provided corresponding to the positions of the cameras 6. Alternatively, a plurality of cameras 6 may be provided on one pillar P.

In the foregoing embodiment, the projector 4 is provided on the inside of the roof R of the vehicle C. However, the projector 4 may be positioned anywhere which allows an image to be projected onto the inner surface of the pillar P. For example, the projector 4 may be provided on the upper side of (the approximate center of) a dashboard and so forth.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. A driving support method using a camera installed in a vehicle for imaging a dead-angle area created by a pillar of the vehicle and for displaying an image captured by the camera on the interior side of the pillar, comprising the steps of:
   determining a center position of the head of a driver of the vehicle;
   setting an indication on a road surface or an object installed on or near a road, approached by the vehicle, as a drawing reference object, utilizing stored map data for positions of indications on a road surface or objects installed on or near the road;
   setting a virtual plane at a position that passes through the drawing reference object and through the determined center position of the head of the driver of the vehicle;
   performing a coordinate conversion by transferring image data input from the camera onto the virtual plane; and
   displaying an image corresponding to the dead-angle area on the interior side of the pillar using the image data for which the coordinate conversion has been performed.

2. A driving support apparatus using a camera installed in a vehicle for imaging a dead-angle area created by a pillar of the vehicle and for displaying an image captured by the camera on the interior side of the pillar, comprising:

sensor means for determining a center position of the head of a driver of the vehicle;

target object setting means for setting an indication on a road surface or an object installed on or near a road, approached by the vehicle, as a drawing reference object, wherein the target object setting means utilizes stored map data for positions of indications on a road surface or objects installed on and near a road, and sets the indication on the road surface or the installed object as the drawing reference object;

virtual plane setting means for setting a virtual plane at a position that passes through the drawing reference object and through the determined center position of the head of the driver of the vehicle;

image processing means for performing a coordinate conversion by transferring image data input from the camera onto the virtual plane; and output control means for displaying an image corresponding to the dead-angle area on the interior side of the pillar using the image data for which the coordinate conversion has been performed.

3. The driving support apparatus according to claim 2, wherein the camera has an imaging plane set intersecting the virtual plane.

4. A driving support method according to claim 1 wherein the camera has an imaging plane set intersecting the virtual plane.

* * * * *